United States Patent [19]

Tanaka et al.

[11] Patent Number: 5,093,868
[45] Date of Patent: Mar. 3, 1992

[54] METHOD FOR DETERMINING LINES OF CHARACTER IMAGES FOR USE IN AN OPTICAL READER

[75] Inventors: Hideaki Tanaka, Osaka; Toshiaki Morita, Nara; Yoshihiro Kitamura, Osaka; Yasuhisa Nakamura, Kyoto, all of Japan

[73] Assignee: Sharp Kabushiki Kaisha, Osaka, Japan

[21] Appl. No.: 510,874

[22] Filed: Apr. 18, 1990

[30] Foreign Application Priority Data

Apr. 18, 1989 [JP] Japan ................................. 1-99372

[51] Int. Cl.⁵ .............................................. G06K 9/34
[52] U.S. Cl. ............................................ 382/9; 382/48
[58] Field of Search .......................... 382/9, 48, 13, 67

[56] References Cited

U.S. PATENT DOCUMENTS

| | | | |
|---|---|---|---|
| 4,528,692 | 7/1985 | Umeda et al. | 382/9 |
| 4,594,732 | 6/1986 | Tsuji | 382/9 |
| 4,903,311 | 2/1990 | Nakamura | 382/9 |
| 4,926,490 | 5/1990 | Mano | 382/9 |

FOREIGN PATENT DOCUMENTS

| | | |
|---|---|---|
| 0054439 | 6/1982 | European Pat. Off. |
| 63-101983 | 5/1988 | Japan . |
| 63-158677 | 7/1988 | Japan . |
| 63-292381 | 11/1988 | Japan . |

Primary Examiner—Leo H. Boudreau

[57] ABSTRACT

A method for determining lines of character images in a recognition area for use in an optical character reader. In the line determining method, the character images in the recognition area are read by an image scanner so as to obtain image data of the character images in the recognition area. A circumscribed rectangular frame for enclosing each character is then determined based on the obtained image data so as to obtain coordinates of the circumscribed rectangular frame. Thereafter, circumscribed rectangular frames adjacent in a direction of the lines to each circumscribed rectangular frame are determined so as to obtain a connection relationship between the circumscribed rectangular frames as seen from each circumscribed rectangular frame, and then, the lines are determined based on the obtained connection relationship between the circumscribed rectangular frames.

3 Claims, 11 Drawing Sheets

Fig. 5 companies] act like this outfit."
General's stance is indeed in sharp contrast to that of its big competitors, who won a modest settlement last year without going for the URW's jugular. In exchange for major concessions, Uniroyal Inc. has allowed the union to audit its books and given URW President Milan Stone the right to appear before its board. In recent local bargaining, other companies often have used persuasion instead of hardball tactics to win changes in work rules that improve productivity. Firestone Tire & Rubber Co.,

Fig. 6 companies] act like this outfit."
General's stance is indeed in sharp contrast to that of its big competitors, who won a modest settlement last year without going for the URW's jugular. In exchange for major concessions, Uniroyal Inc. has allowed the union to audit its books and given URW President Milan Stone the right to appear before its board. In recent local bargaining, other companies often have used persuasion instead of hardball tactics to win changes in work rules that improve productivity. Firestone Tire & Rubber Co.,

METHOD FOR DETERMINING LINES OF CHARACTER IMAGES FOR USE IN AN OPTICAL READER

BACKGROUND OF THE INVENTION

1. Field of the Invention

The present invention relates to a method for determining lines for use in an optical character reader, more particularly, to a method for determining lines upon processing character images in an optical character reader.

2. Description of Background Art

In a conventional method for determining lines upon processing character images in an optical character reader, there are made histogram data in a direction of parallel lines representing the distribution of black pixels located at peripheral portions of each character in a recognition area, and the lines of the character images to be recognized are determined by detecting each gap between respective adjacent histogram data.

However, in the conventional method for determining the lines of the character images, when there is a ruled line drawn in the longitudinal direction or when there is a photographic pictorial image in the recognition area, there is such a problem that it is difficult to determine the lines of the character images in the recognition area.

SUMMARY OF THE INVENTION

An essential object of the present invention is to provide a method for determining lines of character images for use in an optical character reader, which is capable of determining the lines of the character images more correctly, even if there is a ruled line drawn in the longitudinal direction in the recognition area.

Another object of the present invention is to provide a method for determining lines of character images for use in an optical character reader, which is capable of determining the lines of the character images more correctly, even if there is a photographic pictorial image in the recognition area.

A further object of the present invention is to provide a method for determining lines of character images for use in an optical character reader, which is capable of determining the lines of the character images more correctly, even if characters which are respectively located on adjacent lines are overlapped.

In order to accomplish the above objects, according to one aspect of the present invention, there is provided a method for determining lines of character images in a recognition area for use in an optical character reader, including:

a first step of reading the character images in the recognition area so as to obtain image data of the character images in the recognition area;

a second step for determining a circumscribed rectangular frame for enclosing each character based on the obtained image data so as to obtain coordinates of the circumscribed rectangular frame;

a third step for determining circumscribed rectangular frames adjacent in a direction of the lines to each circumscribed rectangular frame so as to obtain a connection relationship between the circumscribed rectangular frames as seen from each circumscribed rectangular frame; and a fourth step for determining the lines based on the obtained connection relationship between the circumscribed rectangular frames.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

These and other objects and features of the present invention will become clear from the following detailed description given hereinbelow and the accompanying drawings which are given by way of illustration only, and thus are not limitative of the present invention in which.

DETAILED DESCRIPTION OF THE PREFERRED EMBODIMENT

An optical character reader 10 for recognizing characters using a method for determining lines of character images (referred to as a line determining method hereinafter) of a preferred embodiment according to the present invention will be described below in an order of the following items with reference to the attached drawings.

(1) Composition of optical character reader
(2) Control flow of line determining process (2-1) Main routine
(2-2) Rectangle connection process
(2-3) Process for determining connected rectangle
(2-4) Fundamental line determining process
(2-5) Process for adding unconnected rectangles into fundamental line In the present preferred embodiment, the optical character reader 10 is provided for recognizing characters, such as alphabetic characters, which are typed with a predetermined font along undrawn parallel lines in the transverse direction in a recognition area.

The line determining method of the present preferred embodiment is characterized and comprised of the following steps.

Figure 5:
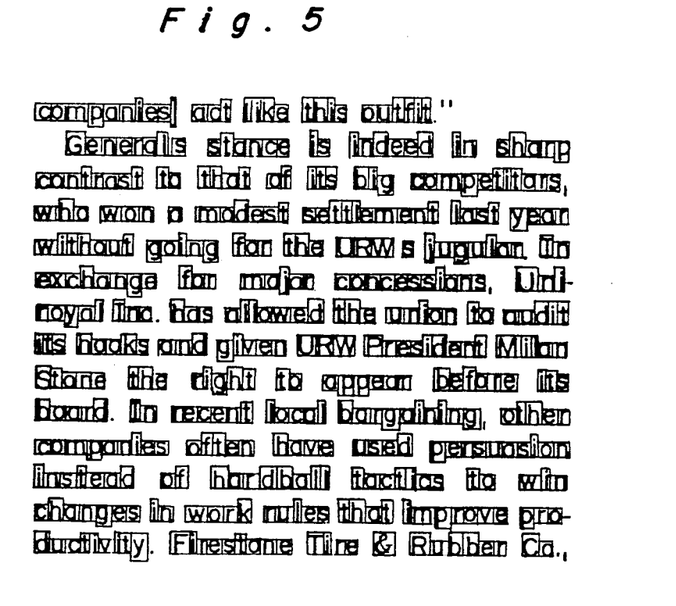
FIG. 5 shows one example of character rectangles which are determined from a recognition area of image characters.

(a) Coordinates of a circumscribed rectangular frame of each character (referred to as character rectangle coordinates hereinafter) are determined from image data which have been read by an image scanner 30 in a manner which is known to those skilled in the art, as shown in FIG. 5. It is to be noted that a circumscribed rectangular frame is referred to a character rectangle hereinafter, wherein each character is enclosed by a circumscribed rectangular frame or a character rectangle.

(b) Thereafter, for all the determined character rectangles, it is judged whether or not two adjacent character rectangles are connected to each other so as to obtain the searched connection relationship in the left and right directions parallel to respective lines from respective character rectangles in a recognition area.

(c) Thereafter, fundamental lines are determined based on data of the searched connection relationship between the character rectangles from respective character rectangles.

Figure 6:
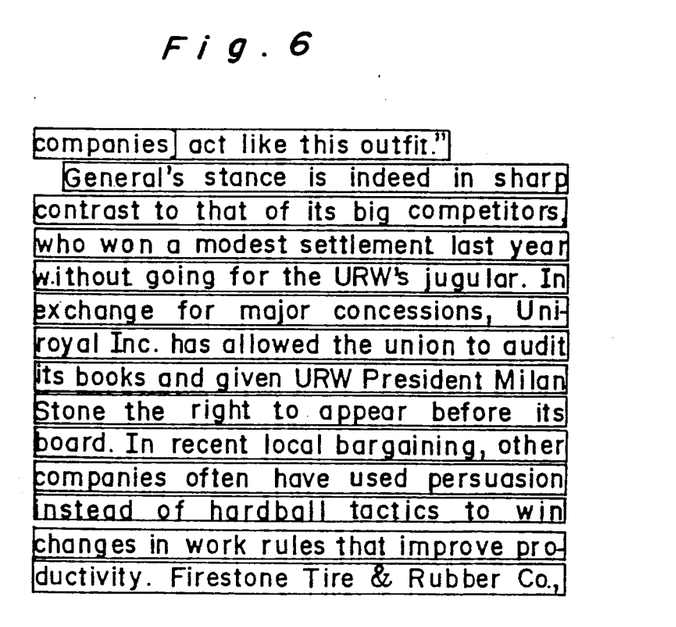
FIG. 6 shows a result of determined lines which is obtained by a method for determining lines of the image characters of the present preferred embodiment.

(d) Thereafter, unconnected character rectangles are added into a fundamental line of the closest therefrom, and then, the determined lines of the character images in the recognition area are obtained as shown in FIG. 6. Then, the line determining process is completed.

Thereafter, respective characters of the character images are recognized based on the lines determined in a manner which is known to those skilled in the art, and then, the recognized characters are displayed on the CRT display unit 40.

(1) Composition of Optical Character Reader

Figure 1:
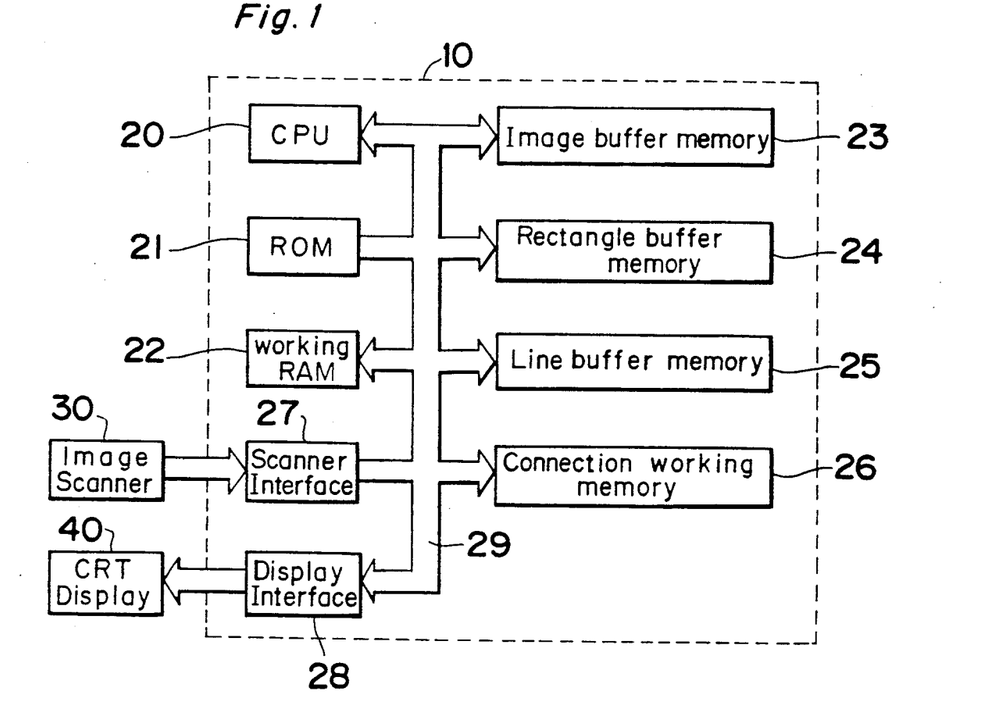
FIG. 1 is a block diagram showing an optical character reader of a preferred embodiment according to the present invention.

FIG. 1 shows the composition of the optical character reader 10 for recognizing character images in a recognition area after determining the lines of the character images using the line determining method of a preferred embodiment of the present invention, and peripheral units thereof.

Referring to FIG. 1, the optical character reader 10 comprises a CPU 20 for controlling an image recognition process including the line determining process, a ROM 21 for storing a system program comprising the image recognition process including the line determining process, and a working RAM 22 for storing data required for executing the image recognition process. The optical character reader further comprises an image buffer memory 23 comprised of a RAM for storing image data which have been read by the image scanner 30, a rectangle buffer memory 24 comprised of a RAM for storing coordinate data of respective character rectangles, a line buffer memory 25 for storing a start rectangle address and an end rectangle address of each line, and a connection working memory 26 comprised a RAM for storing data required upon executing the process for determining connected character rectangles. The optical character reader also comprises a scanner interface 27 connected to the image scanner 30 for reading character images and transforming them into image data and a display interface 28 connected to a CRT display unit 40 for displaying recognized character images and determined lines thereof, which are connected through a bus 29.

(2) Control Flow of Line Determining Process

First of all, the character rectangle coordinates of respective character images are determined from image data which have been read by an image scanner 30 in a manner which is known to those skilled in the art as shown in FIG. 5, and then, data thereof are stored in the rectangle buffer memory 24. Thereafter, the following main routine of the line determining process is executed.

Figure 2:
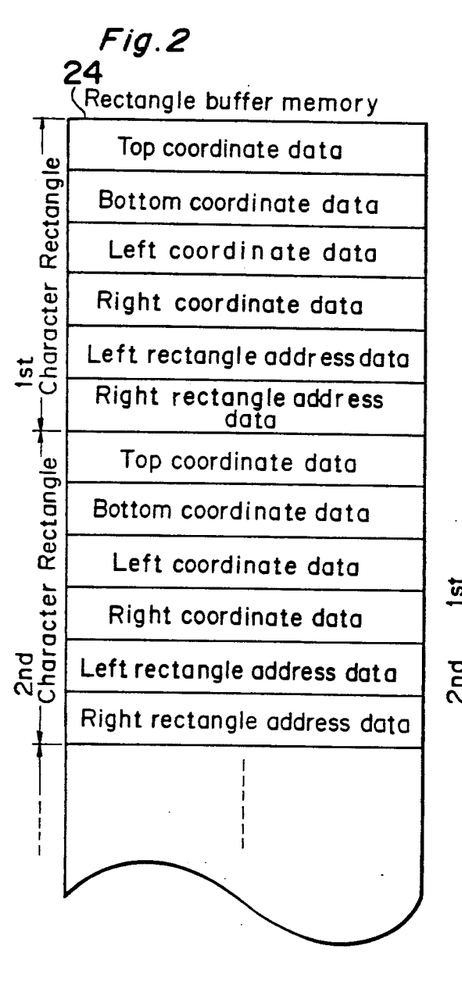
FIG. 2 is a memory map of a rectangle buffer memory shown in FIG. 1.

It is to be noted that, in the rectangle buffer memory 24, top coordinate data, bottom coordinate data, left coordinate data, right coordinate data, left rectangle address data and right rectangle address data are stored for each character rectangle, as shown in FIG. 2. Respective coordinate data are composed of X-coordinate data in the line direction corresponding to a main scan direction of the image scanner 30 and Y-coordinate data in a direction perpendicular to the line direction corresponding to a subscan direction of the image scanner 30. The left and right rectangle address data are an address of the rectangle buffer memory 24 at which there are stored data of the character rectangle coordinates of a character rectangle (referred to as a left character rectangle hereinafter) to which a specific character rectangle is connected in the left direction, and an address thereof at which there are stored data of the character rectangle coordinates of a character rectangle (referred to as a right character rectangle hereinafter) to which the specific character rectangle is connected in the right direction, respectively. All the right and left rectangle address data are initialized to be reset to zero at the beginning of the line determining process.

(2-1) Main routine

Figure 9:
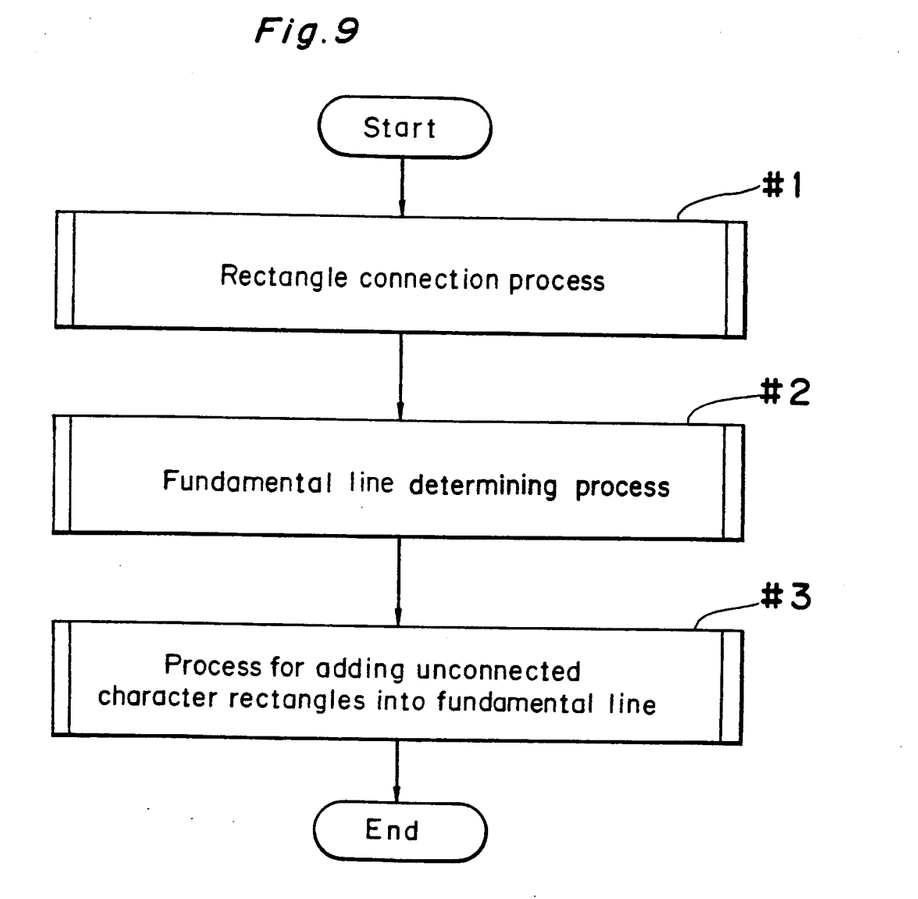
FIG. 9 is a flowchart showing a main routine of a process for determining lines of character images in a recognition area which is provided in the optical character reader shown in FIG. 1.

FIG. 9 shows the main routine of the line determining process of the present preferred embodiment.

Referring to FIG. 9, first of all, there is executed a rectangle connection process for obtaining the connection relationship in the left and right directions from respective character rectangles in a recognition area at step #1, and then, there is executed a fundamental line determining process for determining fundamental lines based on data of the connection relationship having been obtained by the rectangle connection process at step #2. Thereafter, there is executed a process for adding unconnected character rectangles into a fundamental line of the closest therefrom at step #3, and then, the determined lines of the character images in the recognition area are obtained as shown in FIG. 6. Then, the line determining process is completed.

Thereafter, respective characters of the character images are recognized based on the determined lines in a manner which is known to those skilled in the art, and then, the recognized characters are displayed on the CRT display unit 40.

The processes of respective subroutines will be described below with reference to flowcharts shown in FIGS. 10a, 10b, 11a, 11b, 12 and 13.

(2-2) Rectangle connection process

Figure 10A:
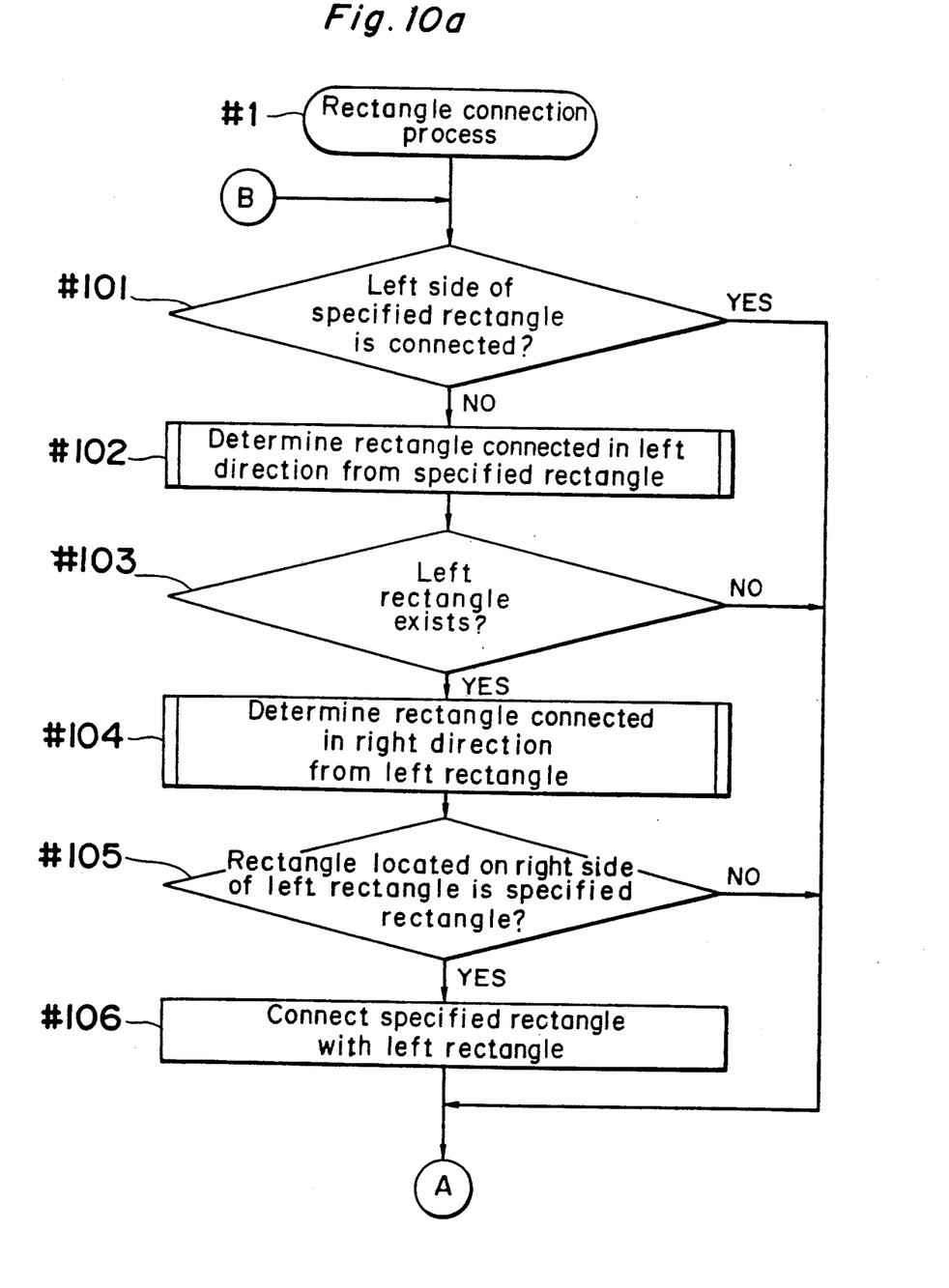
FIGS. 10a and 10b are flowcharts showing a subroutine of a rectangle connection process shown in FIG. 9.
Figure 10B:
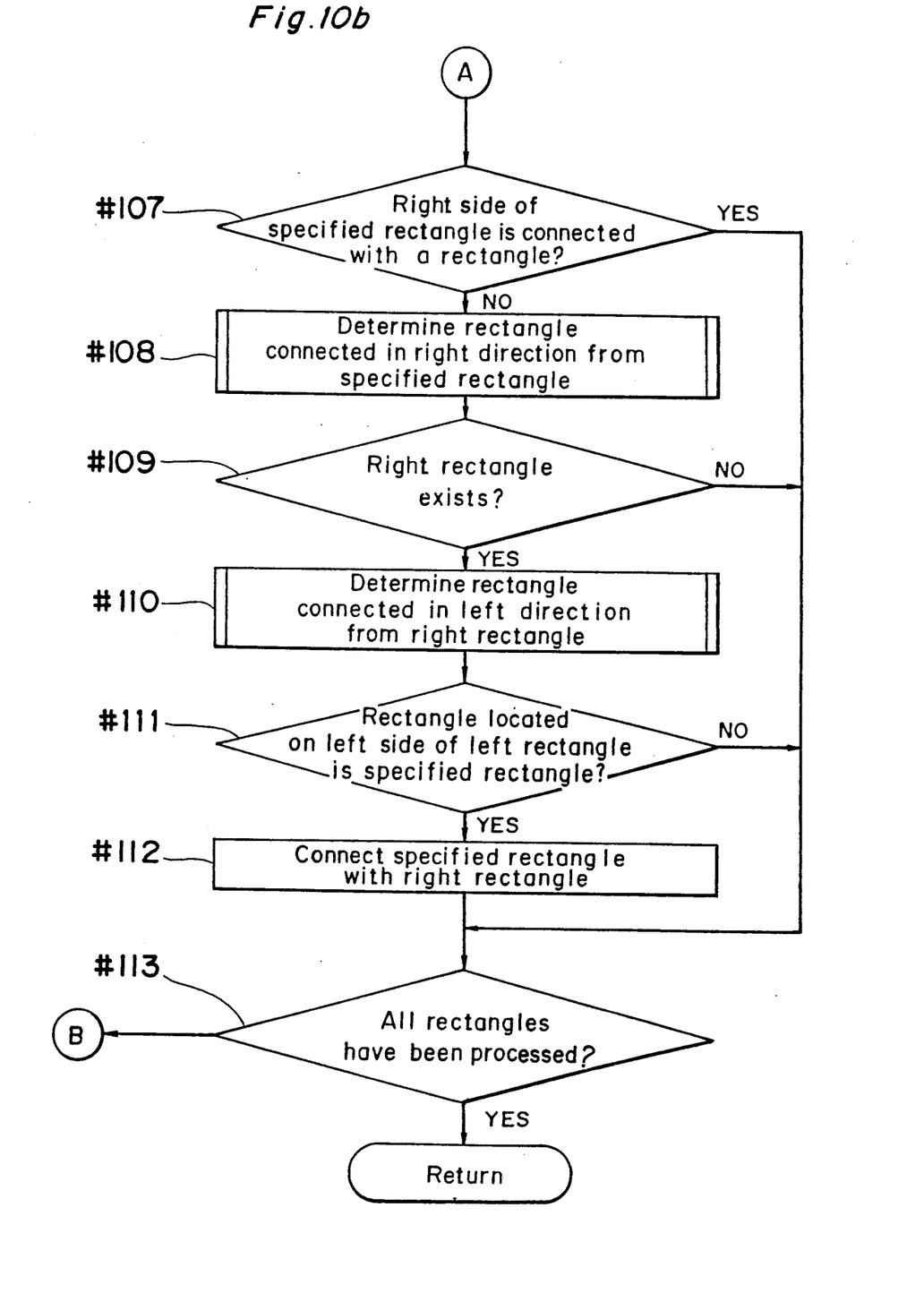

FIGS. 10a and 10b show the subroutine of the rectangle connection process shown in FIG. 9.

Referring to FIG. 10a, first of all, a first character rectangle stored in the rectangle buffer memory 24 is referred to as a specified character rectangle, and it is judged at step #101 whether or not the specified character rectangle is connected in the left direction to a left character rectangle, or the left rectangle address data of the specified character rectangle stored in the rectangle buffer memory 24 are set at a value which is not zero.

If a left character rectangle is connected to the specified character rectangle (Yes at step #101), the program flow goes to step #107. Otherwise (No at step #101), an optimum left character rectangle is determined at step #102 by scanning the character rectangles having a connection relationship in the left direction from the specified character rectangle, in the subroutine of the process for determining the connected character rectangle shown in FIGS. 11a and 11b, and then, the determined optimum character rectangle is defined as the left character rectangle of the specified character rectangle.

Thereafter, it is judged at step #103 whether or not there is a left character rectangle of the specific character rectangle at step #102. If there is no left character rectangle thereof (No at step #103), the program flow goes to step #107. On the other hand, if there is a left character rectangle of the specified character rectangle (Yes at step #103), an optimum character rectangle which is connected in the right direction from the left character rectangle is determined at step #104 in a manner similar to that of step #102, and then, the determined optimum character rectangle is defined as the right character rectangle of the left character rectangle. Thereafter, the program flow goes to step #105.

At step #105, it is judged whether or not the determined right character rectangle of the left character rectangle is the specified character rectangle. If the determined right character rectangle of the left character rectangle is not the specified character rectangle (No at step #105), the program flow goes to step #107. On the other hand, if the determined right character rectangle of the left character rectangle is the specified character rectangle (Yes at step #105), the program flow goes to step #106, and then, the connection process between the specified character rectangle and the left character rectangle is executed as follows. Namely, the address of the left character rectangle is stored as the left rectangle address data of the specified character rectangle in the rectangle buffer memory 24, and the address of the specified character rectangle is stored as the right rectangle address data of the left character rectangle in the rectangle buffer memory 24. After storing the above two addresses, the connection process between the specified character rectangle and the left character rectangle is completed.

The reason why the connection process is executed only if the right character rectangle of the left character rectangle is determined, after determining the left character rectangle, of the specified character rectangle and that the determined right character rectangle is the specified character rectangle, is to more correctly connect the adjacent character rectangles and to determine the lines of the character images, even though there is a character comprising separate top and bottom components such as letters of i, j.

Figure 7:
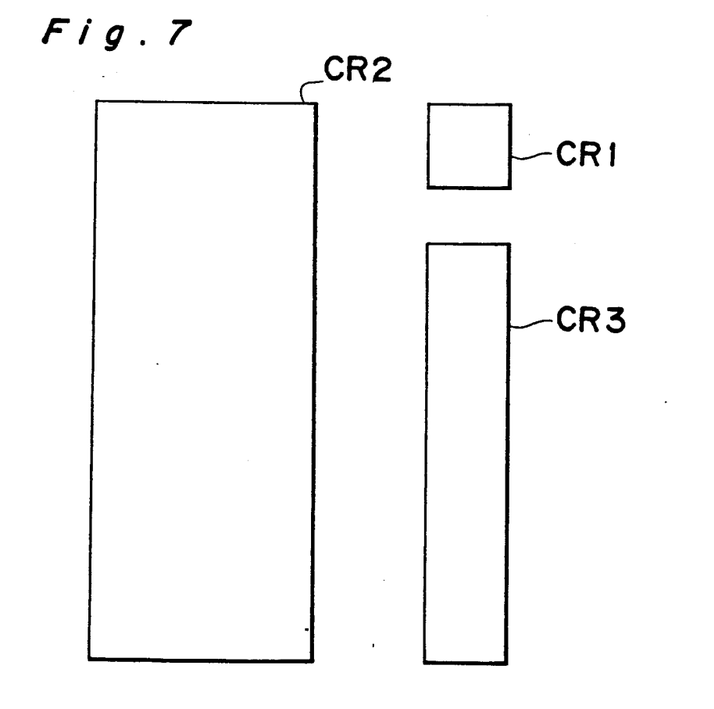
FIG. 7 is a schematic diagram showing one example of a positional relationship among three character rectangles.
Figure 8A:
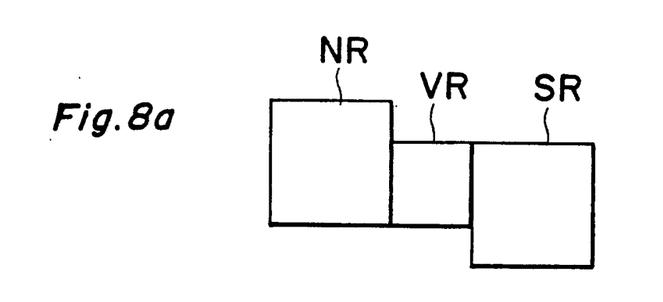
FIGS. 8a to 8d are schematic diagrams showing an overlap relationship among a specified character rectangle, a close character rectangle and a virtual character rectangle located therebetween.
Figure 8B:
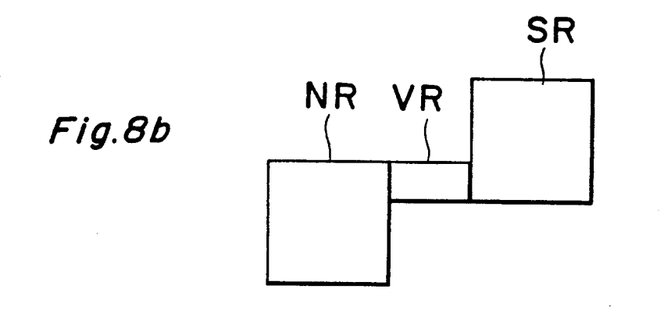
Figure 8C:
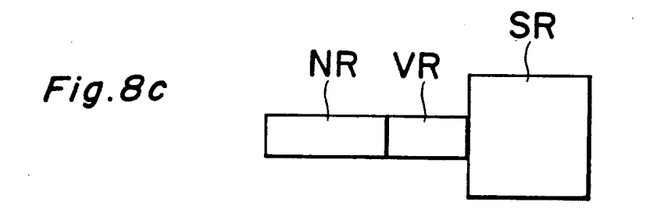
Figure 8D:
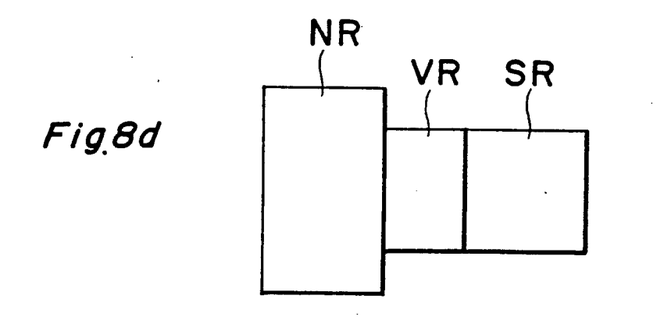

Namely, in the case that there are three character rectangles having a positional relationship as shown in FIG. 7, a character rectangle CR2 is determined as the optimum left character rectangle of the specified character rectangle CR1, and a character rectangle CR3 is determined as the optimum right character rectangle of the left character rectangle CR2. Therefore, in the above connection process of the present preferred embodiment, it is judged that there is no connection in the left direction from the specified character rectangle CR1. On the other hand, when the character rectangle CR3 is referred to as a specified character rectangle, the character rectangle CR2 is determined as the optimum left character rectangle of the specified character rectangle, and the character rectangle CR3 is determined as the optimum right character rectangle of the left character rectangle CR2.

In the case that the connection process is executed after determining the character rectangle in one direction from the specified character rectangle, if it is judged that the character rectangle CR1 is connected to the character rectangle CR2, it may be determined that a character rectangle such as a comma located on the line upper than that of the specified character rectangle is connected to the character rectangle CR1, for example, because the character images are typed to be inclined from the lines parallel to the horizontal direction. As a result, the line may not be determined correctly, and a line determining error occurs. In order to prevent the line determining error from occurring, the above-mentioned connection process is executed after determining the character rectangle in two directions from the specified character rectangle.

After executing the above connection process in the left direction from the specified character rectangle from step #101 to #106, the connection process in the right direction therefrom is executed from step #107 to #112 in a manner similar to that of step #101 to #106, as shown in FIG. 10b.

Finally, it is judged at step #113 whether or not all the character rectangles in the recognition area have been processed in the left and right directions in the rectangle connection process. If all the character rectangles have been processed therein (Yes at step #113), the program flow returns to the main routine. Otherwise (No at step #113), the program flow goes back to step #101 in order to execute the rectangle connection process for the next character rectangle.

(2-3) Process for determining connected rectangle

Figure 11A:
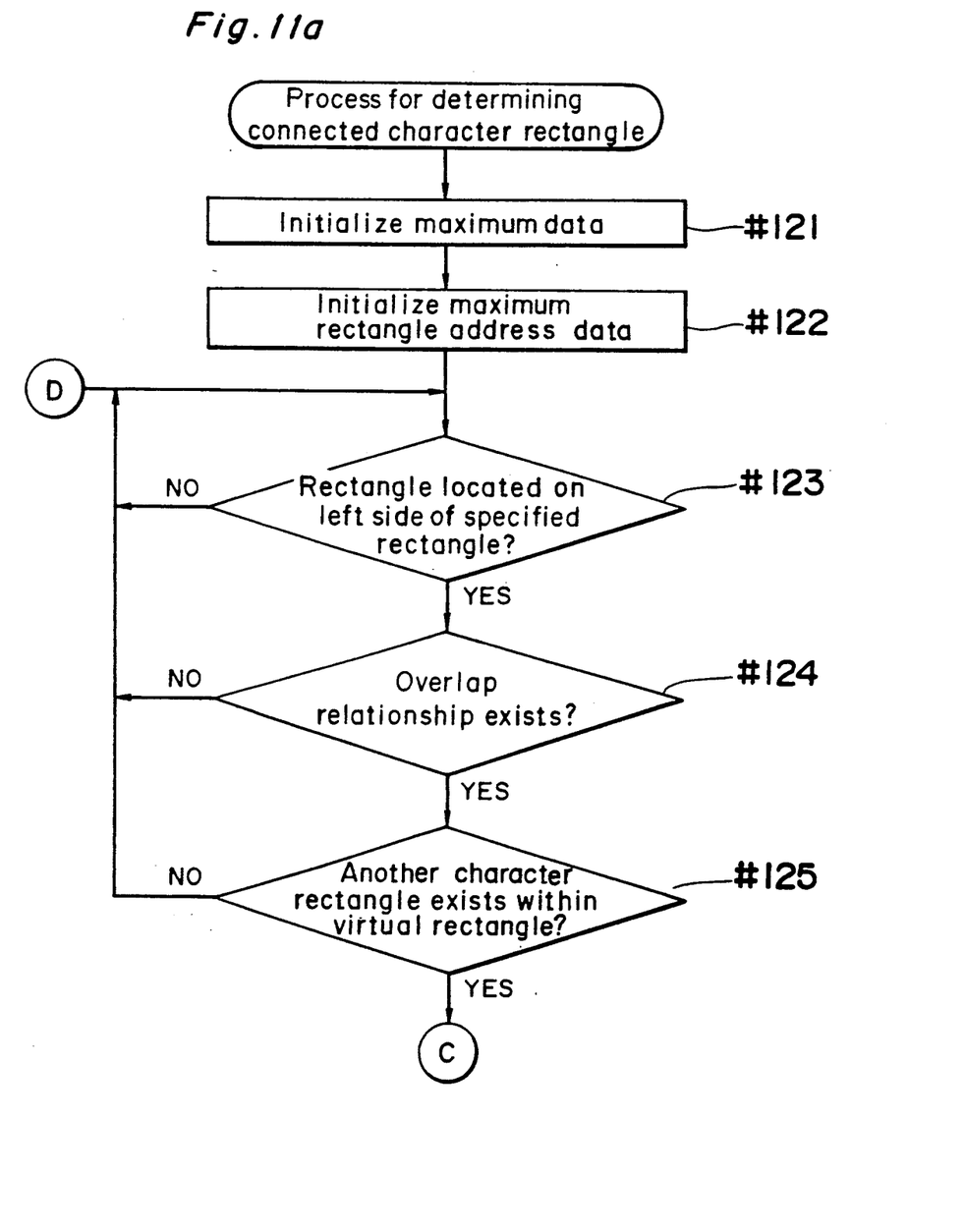
FIGS. 11a and 11b are flowcharts showing a process for determining connected character rectangles shown in FIGS. 10a and 10b.
Figure 11B:
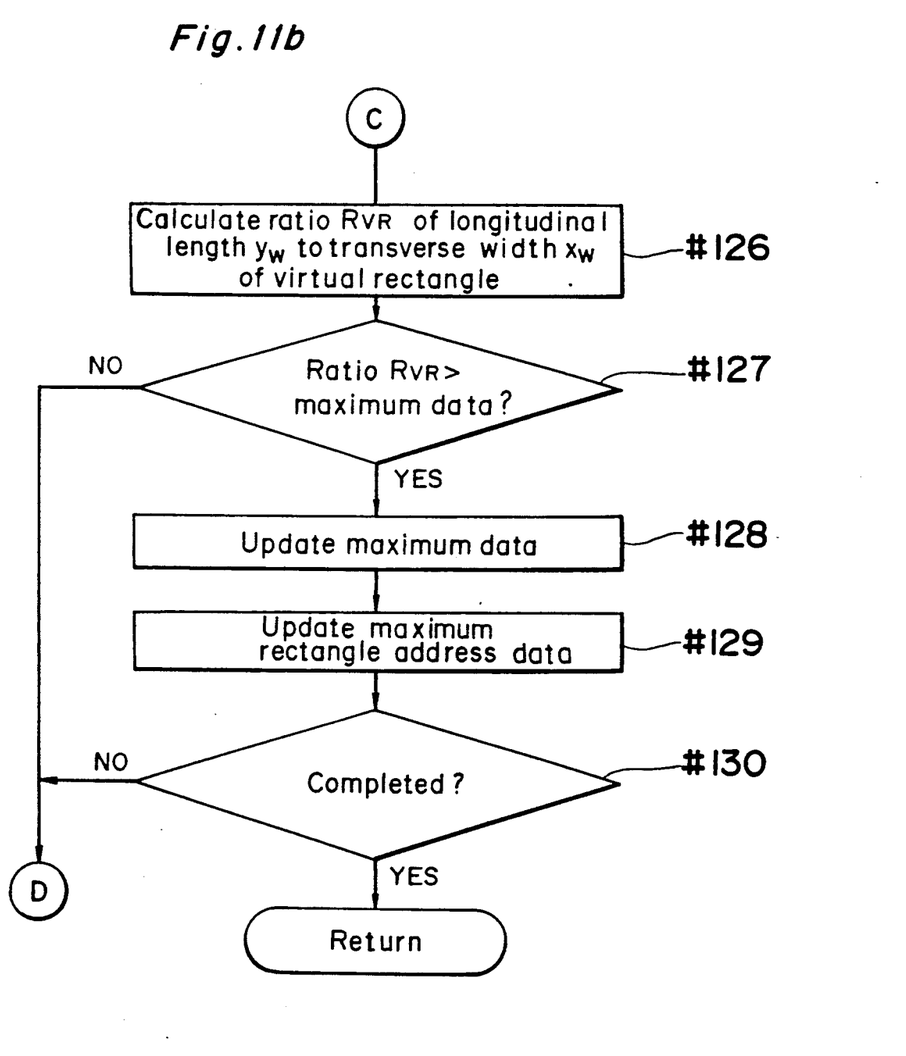

FIGS. 11a and 11b shows the process for determining the connected rectangle in the left direction from the specified character rectangle.

Figure 3:
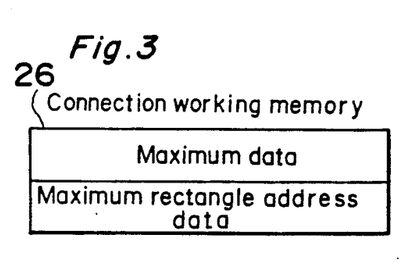
FIG. 3 is a memory map of a connection working memory shown in FIG. 1.

Referring to FIG. 11a, first of all, maximum data and maximum rectangle address data stored in the connection working memory 26 shown in FIG. 3 are initialized to be reset to zero at steps #121 and #122, respectively, and then, the program flow goes to step #123.

At step #123, it is judged whether or not there is a character rectangle on the left side of the specified character rectangle by scanning the character rectangles close to the specified character rectangle. If there is no character rectangle on the left side of the specified character rectangle (No at step #123), the present process is stopped for the specific character rectangle. Thereafter, the program flow goes back to step #123, and the next character rectangle close thereto is processed. On the other hand, if there is a character rectangle on the left side of the specified character rectangle (Yes at step #123), the program flow goes to step #124, and then, it is judged whether or not there is an overlap relationship in the longitudinal direction between the character rectangle close to the specified character rectangle (referred to as a close character rectangle hereinafter) which is located on the left side of the specified character rectangle, and the specified character rectangle.

In the present preferred embodiment, it is judged that there is an overlap relationship in the longitudinal direction between the specified character rectangle SR and the close character rectangle NR if the close character rectangle NR is located through a virtual character rectangle VR on the left side of the specified character rectangle SR as in one of the arrangements as shown in FIGS. 8a to 8d. It is to be noted that a portion of the area located between the specified character rectangle SR and the close character rectangle NR is defined as a virtual character rectangle VR, as shown in FIGS. 8a to 8d.

If it is judged that there is no overlap relationship therebetween (No at step #124), the present process is stopped for the specific character rectangle. Thereafter, and the program flow goes back to step #123, and the next character rectangle close thereto is started to be processed. On the other hand, if it is judged that there is an overlap relationship in the longitudinal direction therebetween (Yes at step #124), the program flow goes to step #125, and then, it is judged whether or not there is a character rectangle other than the specified character rectangle SR and the close character rectangle NR within an area of the virtual character rectangle VR.

If it is judged that there is not another character rectangle within the area of the virtual character rectangle VR (No at step #125), the present process is stopped for the specific character rectangle. Thereafter, the program flow goes back to step #123, and the next character rectangle close thereto is started to be processed. On the other hand, if there is another rectangle within the area of the virtual character rectangle VR (Yes at step #125), the program flow goes to step #126, and then, there is calculated a ratio $R_{VR}$ of the longitudinal length $y_w$ to the transverse width $x_w$ of the virtual character rectangle VR which is represented by the following equation.

$$R_{VR} = y_w / x_w \qquad (1)$$

Thereafter, the program flow goes to step #127, and then, it is judged whether or not the calculated ratio $R_{VR}$ is larger than the maximum data stored in the connection working memory 26 shown in FIG. 3. If the calculated ratio $R_{VR}$ is equal to or smaller than the maximum data (No at step #127), the present process is stopped for the specific character rectangle. Thereafter, the program flow goes back to step #123, and the next character rectangle close thereto is processed. On the other hand, if the calculated ratio $R_{VR}$ is larger than the maximum data (Yes at step #127), the program flow goes to step #128, and then, the maximum data of the connection working memory 26 is updated to the ratio $R_{VR}$ calculated at step #126. Thereafter, the maximum rectangle address data are set at the address of the present close character rectangle NR at step #129, and then, it is judged at step #130 whether or not the process for determining the connected character rectangle is completed for all the close character rectangles of the specified character rectangle. If the process for determining the connected character rectangle is not completed (No at step #130), the program flow goes back to step #123, and then, the process from step #123 is executed for the next close character rectangle. On the other hand, if the process for determining the connected character rectangle is completed (Yes at step #130), the program flow returns to the original routine.

After the above process is completed, if the maximum rectangle address data stored in the connection working memory 26 are set at a value which is not equal to zero, the maximum rectangle address data are referred to as the address of the optimum connected character rectangle. On the other hand, if the maximum rectangle address data thereof are still set at zero, it is judged that there is no connected character rectangle to be obtained.

In FIGS. 11a and 11b, the process for determining the connected rectangle in the left direction from the specified character rectangle is as described above, and the process for determining the connected rectangle in the right direction from the specified character rectangle is executed in a manner similar to that of the determination process shown in FIGS. 11a and 11b.

(2-4) Fundamental line determining process

Figure 12:
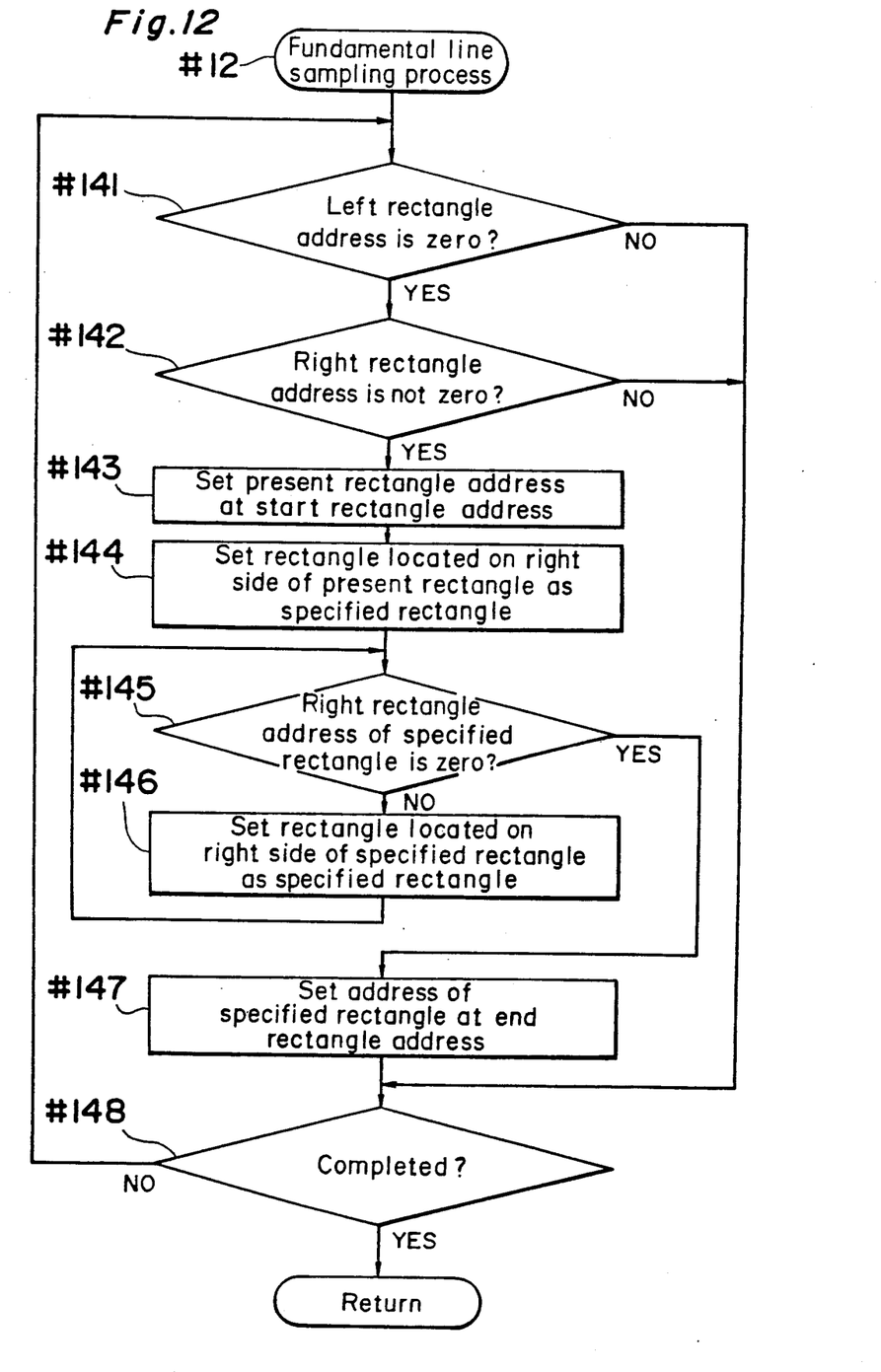
FIG. 12 is a flowchart showing a subroutine of a line determining process shown in FIG. 9.

FIG. 12 shows the fundamental line determining process shown in FIG. 9. After executing the aforementioned connection process for all the character rectangles of the recognition area, the fundamental line determining process is executed for data of all the character rectangles stored in the rectangle buffer memory 24 in order to determine the fundamental lines of the character images of the recognition area.

Referring to FIG. 12, for a specified character rectangle, it is judged whether or not the left rectangle address data are zero at step #141, and it is judged whether or not the right rectangle address data are set at a value which is not zero at step #142. If the left rectangle address data of the specified character rectangle are zero (Yes at step #141) and the right rectangle address data thereof are set at a value which is not zero (Yes at step #142), the specified character rectangle is referred as the start character rectangle of a line, and the rectangle address of the specified character rectangle is stored as the start rectangle address data in the line buffer memory 25 shown in FIG. 4 at step #143. Thereafter, the character rectangle of the right rectangle address data of the start character rectangle which are stored in the rectangle buffer memory 24 is referred as the specific character rectangle at step #144, and then, the program flow goes to step #145.

On the other hand, if the left rectangle address data of the specified character rectangle are not zero (No at step #141) or if the right rectangle address data thereof are set at zero (No at step #142), the program flow goes to step #148.

It is judged at step #145 whether or not the right rectangle address data of the specified character rectangle which are stored in the rectangle buffer memory 24 are set at zero. If the right rectangle address data thereof are zero (Yes at step #145), the program flow goes to step #147, and then, the address of the specified character rectangle is set as the end rectangle address data in the line buffer memory 25. Thereafter, the program flow goes to step #148.

On the other hand, if the right rectangle address data are set at a value which is not zero (No at step #145), the right character rectangle of the specified character rectangle is referred as the new specified character rectangle at step #146, and then, the program flow goes to step #145 in order to execute the loop process of steps #145 and #146 until the right rectangle address data of the specified character rectangle are zero (Yes at step #145).

At step #148, it is judged whether or not the fundamental line determining process is executed for all the character rectangles. If the fundamental line determining process is completed (Yes at step #148), the program returns. Otherwise (No at step #148), the program flow goes back to step #141 in order to start the fundamental line determining process for the next character rectangle.

Figure 4:
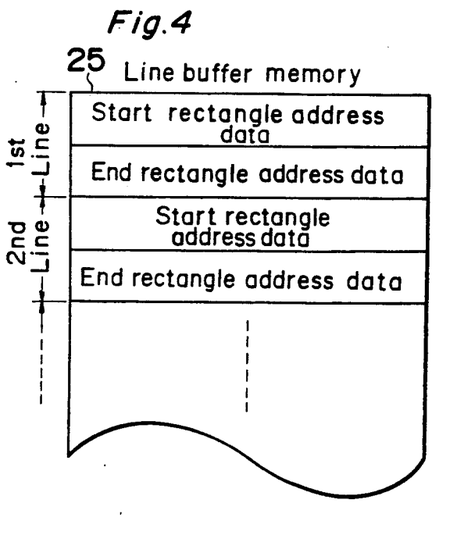
FIG. 4 is a memory map of a line buffer memory shown in FIG. 1.

In the line buffer memory 25 shown in FIG. 4, one fundamental line is represented by one start rectangle address data and one end rectangle address data.

(2-5) Process for adding unconnected rectangles into fundamental line

Figure 13:
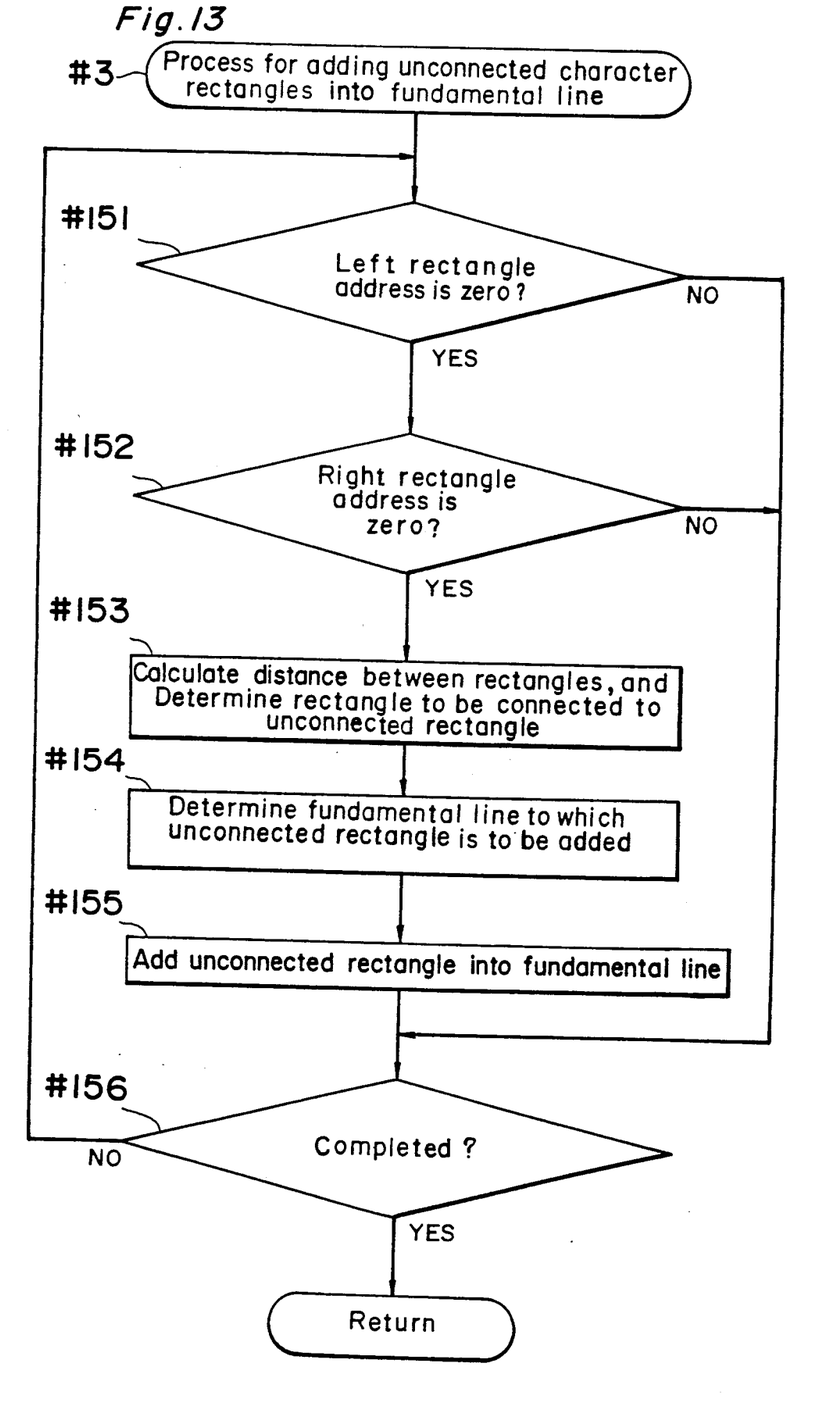
FIG. 13 is a flowchart showing a subroutine of a process for adding unconnected rectangles shown in FIG. 9.

FIG. 13 shows a process for adding the unconnected rectangles into a fundamental line which is shown in FIG. 9. This process is executed for data of all the character rectangles stored in the rectangle buffer memory 24.

First of all, for a specified character rectangle, it is judged whether or not the left rectangle address data of the specified character rectangle are zero at step #151, and it is judged whether or not the right rectangle address data thereof are zero at step #152. If the left rectangle address are zero (Yes at step #151) and the right rectangle address data are zero (Yes at step #152), the program flow goes to step #153. On the other hand, if the left rectangle address are not zero (No at step #151) or if the right rectangle address data are not zero (No at step #152), the program flow goes to step #156.

At step #153, the specified character rectangle is defined and determined as an unconnected character rectangle, and then, there is searched the closest character rectangle (which is not the unconnected character rectangle) to the above-determined specified unconnected character rectangle by scanning the character rectangles close thereto, wherein a distance between the specified character rectangle and the searched character rectangle becomes the smallest among the distances between the specified character rectangle and the other character rectangles. In the process of step #153, there are calculated the distance between the specified character rectangle and the unconnected character rectangles close thereto according to the following equation (2), and then, there is searched the closest character rectangle to the specified character rectangle.

The distance d between the unconnected character rectangle and the character rectangle close thereto is defined by the following equation with the coordinates of the center of the unconnected character rectangle of (x, y) and the coordinates of the center of the close character rectangle of $(x_i, y_i)$.

$$d^2 = (x - x_i)^2 + (y - y_i)^2 \qquad (2)$$

Thereafter, the fundamental line is determined in which the searched character rectangle is included at step #154, and then, the unconnected character rectangle is added into the determined fundamental line at step #155. Thereafter, it is judged at step #156 whether or not the process from step #151 to step #155 has been executed for all the character rectangles stored in the rectangle buffer memory 24. If the process thereof is completed (Yes at step #156), the program flow returns. On the other hand, the process thereof is not completed (No at step #156), the program flow goes to step #151 in order to execute the process thereof for the next character rectangle.

In the present preferred embodiment, since the lines of character images are determined based on the connection relationship between the character rectangles, the lines can be determined more correctly than the conventional method even if there is a ruled line or photographic pictorial image in a recognition area, or even if character images which are respectively located on adjacent lines are overlapped. Therefore, the recognition rate of the optical character reader can be improved as compared with the conventional optical character reader.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:

1. A method for determining lines of character images in a recognition area for use in an optical character reader, comprising the steps of:
   reading the character images in the recognition area and obtaining image data of the character images in the recognition area;
   determining a circumscribed rectangular frame for enclosing each character based on the obtained image data and obtaining coordinates of the circumscribed rectangular frame for each character;
   determining circumscribed rectangular frames adjacent in a direction of said lines to each circumscribed rectangular frame and obtaining a connection relationship between the circumscribed rectangular frames with respect to each circumscribed rectangular frame, comprising
   judging that another circumscribed rectangular frame is located on one side of a specified circumscribed rectangular frame and the another circumscribed rectangular frame is connected in one side direction to the specified circumscribed rectangular frame when only the another circumscribed rectangular frame is located on the one side of the specified circumscribed rectangular frame and only the specified circumscribed rectangular frame is located on a side of the another circumscribed rectangular frame adjacent the specified circumscribed rectangular frame, and
   judging that the another circumscribed rectangular frame is unconnected on the one side direction to the specified circumscribed rectangular frame otherwise; and
   determining the lines based on the obtained connection relationship between the circumscribed rectangular frames.

2. The method as claimed in claim 1, said step of determining the lines comprising the step of:
   searching for a leftmost circumscribed rectangular frame and a rightmost circumscribed rectangular frame among the determined circumscribed rectangular frames.

3. The method as claimed in claim 1, further comprising the steps of:
   searching for a closest circumscribed rectangular frame to the unconnected circumscribed rectangular frame by calculating a distance between the unconnected circumscribed rectangular frame and the circumscribed rectangular frames close thereto after executing said step of determining the lines; and adding the unconnected circumscribed rectangular frame onto the determined line belonging to the closest circumscribed rectangular frame of the unconnected circumscribed rectangular frame.

* * * * *